United States Patent
Li et al.

(10) Patent No.: US 12,153,157 B2
(45) Date of Patent: Nov. 26, 2024

(54) RADAR SYSTEM WITH PAIRED ONE-DIMENSIONAL AND TWO-DIMENSIONAL ANTENNA ARRAYS

(71) Applicant: Aptiv Technologies AG, Schaffhausen (CH)

(72) Inventors: Zhengzheng Li, Agoura Hills, CA (US); Xin Zhang, Agoura Hills, CA (US); Yu Zhang, Thousand Oaks, CA (US)

(73) Assignee: Aptiv Technologies AG, Schaffhausen (CH)

( * ) Notice: Subject to any disclaimer, the term of this patent is extended or adjusted under 35 U.S.C. 154(b) by 734 days.

(21) Appl. No.: 17/236,893

(22) Filed: Apr. 21, 2021

(65) Prior Publication Data

US 2022/0236370 A1     Jul. 28, 2022

Related U.S. Application Data

(60) Provisional application No. 63/142,434, filed on Jan. 27, 2021.

(51) Int. Cl.
  *G01S 7/03* (2006.01)
  *G01S 13/42* (2006.01)
  (Continued)

(52) U.S. Cl.
  CPC .............. *G01S 7/03* (2013.01); *G01S 13/42* (2013.01); *H01Q 1/3233* (2013.01);
  (Continued)

(58) Field of Classification Search
  CPC .......... G01S 7/03; G01S 13/42; G01S 13/931; H01Q 1/3233; H01Q 21/061; H01Q 21/08; G01Q 21/00
  See application file for complete search history.

(56) References Cited

U.S. PATENT DOCUMENTS

| 5,657,027 A | 8/1997 | Guymon |
| 7,474,262 B2 | 1/2009 | Alland |

(Continued)

FOREIGN PATENT DOCUMENTS

| CN | 106772224 A | 5/2017 |
| CN | 111239678 A | 6/2020 |

(Continued)

OTHER PUBLICATIONS

Pursuant to MPEP § 2001.6(b) the applicant brings the following co-pending application to the Examiner's attention: U.S. Appl. No. 17/075,632.

(Continued)

*Primary Examiner* — Peter M Bythrow
(74) *Attorney, Agent, or Firm* — Harness, Dickey & Pierce, P.L.C.

(57) ABSTRACT

This document describes techniques and systems of a radar system with paired one-dimensional (1D) and two-dimensional (2D) antenna arrays. Even with fewer antenna elements than a traditional radar system, the paired arrays enable an example radar system to have a comparable angular resolution at a lower cost. For example, the 1D array includes antenna elements positioned in a first direction (e.g., azimuth direction) and spaced by a first distance and a second distance. The 2D array includes at least four other antenna elements positioned in the first direction and a second direction (e.g., elevation direction). The other antenna elements are spaced by a third distance in the second direction and by the sum of the first direction and the second direction in the first direction. A processor can associate, using shared angle estimates, angles in the first direction and the second direction for respective objects.

20 Claims, 7 Drawing Sheets

(51) Int. Cl.
  *G01S 13/931* (2020.01)
  *H01Q 1/32* (2006.01)
  *H01Q 21/06* (2006.01)
  *H01Q 21/08* (2006.01)
(52) U.S. Cl.
  CPC .......... *H01Q 21/061* (2013.01); *H01Q 21/08* (2013.01); *G01S 13/931* (2013.01)

(56) References Cited

U.S. PATENT DOCUMENTS

| | | | |
|---|---|---|---|
| 7,639,171 B2 | 12/2009 | Alland et al. | |
| 8,085,183 B2 | 12/2011 | Hildebrandt et al. | |
| 8,310,402 B2 | 11/2012 | Yang | |
| 9,395,727 B1 | 7/2016 | Smith et al. | |
| 9,869,762 B1 | 1/2018 | Alland et al. | |
| 9,958,527 B2 | 5/2018 | Tuxen | |
| 10,042,050 B2 | 8/2018 | Mersseman et al. | |
| 10,371,796 B2* | 8/2019 | Kishigami | G01S 13/325 |
| 10,416,680 B2 | 9/2019 | Li et al. | |
| 10,446,923 B2 | 10/2019 | Watson | |
| 10,481,249 B2* | 11/2019 | Alenljung | G01S 7/354 |
| 10,620,305 B2 | 4/2020 | Cornic et al. | |
| 10,809,737 B2 | 10/2020 | Li et al. | |
| 10,866,304 B1 | 12/2020 | Hassibi et al. | |
| 10,877,146 B2* | 12/2020 | Koerber | G01S 13/42 |
| 10,996,330 B2 | 5/2021 | Meyer et al. | |
| 11,041,940 B1* | 6/2021 | Hong | G01S 7/354 |
| 11,187,795 B2* | 11/2021 | Iwasa | G01S 7/03 |
| 11,415,664 B2 | 8/2022 | Hammes et al. | |
| 11,486,996 B2* | 11/2022 | Ouchi | H01Q 21/06 |
| 11,579,246 B2* | 2/2023 | Lee | H01Q 21/065 |
| 11,619,705 B2 | 4/2023 | Zhang et al. | |
| 11,635,506 B2 | 4/2023 | Iwasa et al. | |
| 2008/0100510 A1* | 5/2008 | Bonthron | G01S 13/89 342/373 |
| 2008/0291077 A1* | 11/2008 | Chang | G01S 13/89 342/179 |
| 2011/0074620 A1* | 3/2011 | Wintermantel | G01S 7/0233 342/70 |
| 2011/0163909 A1* | 7/2011 | Jeong | H01Q 25/002 342/374 |
| 2011/0267217 A1 | 11/2011 | Hildebrandt et al. | |
| 2012/0050091 A1* | 3/2012 | Inami | H01Q 21/061 342/107 |
| 2012/0086604 A1 | 4/2012 | Yang | |
| 2013/0063306 A1 | 3/2013 | Yang | |
| 2014/0218259 A1* | 8/2014 | Lee | H01Q 1/3233 343/852 |
| 2014/0266868 A1 | 9/2014 | Schuman | |
| 2015/0260836 A1* | 9/2015 | Hayakawa | H01Q 13/206 342/368 |
| 2016/0033632 A1* | 2/2016 | Searcy | G01S 13/424 342/153 |
| 2016/0033640 A1 | 2/2016 | Mersseman et al. | |
| 2017/0082730 A1* | 3/2017 | Kishigami | H01Q 21/061 |
| 2017/0149147 A1 | 5/2017 | Minami et al. | |
| 2017/0307744 A1* | 10/2017 | Loesch | H01Q 21/296 |
| 2017/0363713 A1* | 12/2017 | Kim | G01S 13/931 |
| 2017/0365924 A1 | 12/2017 | Topak | |
| 2018/0149735 A1* | 5/2018 | Lim | G01S 13/345 |
| 2018/0149736 A1 | 5/2018 | Alland et al. | |
| 2019/0115670 A1* | 4/2019 | Kishigami | H01Q 21/0025 |
| 2019/0285738 A1* | 9/2019 | Iwasa | G01S 13/003 |
| 2019/0293753 A1* | 9/2019 | Iwasa | G01S 7/2813 |
| 2019/0324133 A1* | 10/2019 | Hong | G01S 7/42 |
| 2019/0324136 A1* | 10/2019 | Amadjikpe | G01S 13/70 |
| 2019/0386712 A1 | 12/2019 | Fang | |
| 2019/0391230 A1* | 12/2019 | Loesch | G01S 13/42 |
| 2020/0004262 A1 | 1/2020 | Li et al. | |
| 2020/0072956 A1* | 3/2020 | Lee | H01Q 21/06 |
| 2020/0112086 A1 | 4/2020 | Kim et al. | |
| 2020/0256947 A1 | 8/2020 | Motoda | |
| 2020/0309899 A1 | 10/2020 | Jonas et al. | |
| 2020/0333457 A1* | 10/2020 | Bialer | G01S 7/352 |
| 2020/0379083 A1* | 12/2020 | Lee | G01S 7/032 |
| 2021/0025961 A1* | 1/2021 | Levy-Israel | G01S 7/03 |
| 2021/0239791 A1 | 8/2021 | Vollbracht et al. | |
| 2021/0239821 A1 | 8/2021 | Vollbracht et al. | |
| 2021/0373144 A1 | 12/2021 | Amani et al. | |
| 2022/0163623 A1* | 5/2022 | Kishigami | H01Q 21/065 |
| 2022/0236370 A1 | 7/2022 | Li et al. | |
| 2022/0276369 A1* | 9/2022 | Yoshizawa | G01S 13/931 |

FOREIGN PATENT DOCUMENTS

| | | |
|---|---|---|
| DE | 102004046634 A1 | 3/2006 |
| DE | 102017221049 A1 | 5/2018 |
| DE | 102017223429 A1 | 7/2018 |
| EP | 2662699 A1 | 11/2013 |
| EP | 3605135 A1 | 2/2020 |
| EP | 3757607 A1 | 12/2020 |
| EP | 3204788 B1 | 3/2022 |
| EP | 4036600 A1 | 8/2022 |
| EP | 4043919 A1 | 8/2022 |
| JP | 6523350 B2 | 5/2019 |
| JP | 2020186972 A | 11/2020 |
| WO | 2014150908 A1 | 9/2014 |
| WO | 2017148561 A1 | 9/2017 |
| WO | 2020007573 A1 | 1/2020 |
| WO | 2021096889 A1 | 5/2021 |

OTHER PUBLICATIONS

Gu, et al., "Joint SVD of Two Cross-Correlation Matrices to Achieve Automatic Pairing in 2-D Angle Estimation Problems", IEEE Antennas and Wireless Propagation Letters, vol. 6, pp. 553-556, 2007, 2007, 4 pages.

Haardt, et al., "Unitary ESPRIT: How to Obtain Increased Estimation Accuracy with a Reduced Computational Burden", May 1995, 1232-1242.

Kikuchi, et al., "Pair-Matching Method for Estimating 2-D Angle of Arrival With a Cross-Correlation Matrix", IEEE Antennas and Wireless Propagation Letters, vol. 5, pp. 35-40, 2006, Jan. 2007, 6 pages.

Moffet, "Minimum-Redundancy Linear Arrays", IEEE Transactions on Antennas and Propagation, vol. AP-16, No. 2., Mar. 1968, pp. 172-175.

Roy, et al., "ESPRIT—Estimation of Signal Parameters Via Rotational Invariance Techniques", Jul. 1989, pp. 984-995.

Tropp, et al., "Signal Recovery From Random Measurements Via Orthogonal Matching Pursuit", IEEE Transactions on Information Theory, vol. 53, No. 12, Dec. 2007, pp. 4655-4666, Dec. 2007, 12 pages.

Vaidyanathan, et al., "Sparse Sensing with Co-Prime Samplers and Arrays", IEEE Trans. Signal Process., vol. 59, No. 2,, Feb. 2011, pp. 573-586.

Van Trees, "Planar Arrays and Apertures", Essay in "Detection, Estimation, and Modulation Theory, Optimum Array Processing", pp. 231-274. Wiley-Interscience, 2001., 2001, 44 pages.

Wang, et al., "Two-Dimensional Beamforming Automotive Radar with Orthogonal Linear Arrays", 2019 IEEE Radar Conference, Boston, MA, Apr. 22-26, 2019., 2019, 6 pages.

Zoltowski, et al., "Closed-Form 2-D Angle Estimation with Rectangular Arrays in Element Space or Beamspace via Unitary ESPRIT", Feb. 1996, pp. 316-328.

"Extended European Search Report", EP Application No. 21196394.7, Mar. 4, 2022, 11 pages.

Amin, et al., "Sparse Arrays and Sampling for Interference Mitigation and DOA Estimation in GNSS" Proceedings of the IEEE, vol. 104, No. 6, Jun. 2016, pp. 1302-1317.

Gu, et al., "Robust Adaptive Beamforming Based on Interference Covariance Matrix Reconstruction and Steering Vector Estimation", IEEE Transactions on Signal Processing, vol. 60, Issue: 7, Jul. 2012, 5 pages.

Feger, et al., "A 77-GHz FMCW MIMO Radar Based on an SiGe Single-Chip Transceiver", IEEE Transactions on Microwave Theory and Techniques, vol. 57, No. 5, May 2009, pp. 1020-1035.

(56) References Cited

OTHER PUBLICATIONS

Razavi-Ghods, "Characterisation of MIMO Radio Propagation Channels", Durham theses, Durham University. Available at Durham E-Theses Online: http://etheses.dur.ac.uk/2526/ (Year: 2007), 349 pages.

Yu, et al., "MIMO Adaptive Beamforming for Nonseparable Multipath Clutter Mitigation", IEEE Transactions on Aerospace and Electronic Systems, vol. 50, No. 4, Oct. 2014, pp. 2604-2618.

"Extended European Search Report", EP Application No. 21196393.9, Feb. 28, 2022, 11 pages.

"Extended European Search Report", EP Application No. 21215410.8, Jul. 12, 2022, 9 pages.

"Extended European Search Report", EP Application No. 21216322.4, Jun. 3, 2022, 9 pages.

Chen, et al., "A new method for joint DOD and DOA estimation in bistatic MIMO radar", Feb. 2010, pp. 714-718.

Engels, et al., "Automotive MIMO Radar Angle Estimation in the Presence of Multipath", Oct. 2017, 5 pages.

Gu, et al., "Adaptive Beamforming via Sparsity-Based Reconstruction of Covariance Matrix", Compressed Sensing in Radar Signal Processing, 2019, 33 pages.

Gu, et al., "Robust Adaptive Beamforming Based on Interference Covariance Matrix Sparse Reconstruction", Signal Processing, vol. 96, Mar. 1, 2014, pp. 375-381.

Jiang, et al., "Joint DOD and DOA Estimation for Bistatic MIMO Radar in Unknown Correlated Noise", Nov. 2015, 5113-5125.

Jin, "Joint DOD and DOA estimation for bistatic MIMO radar", Feb. 2009, pp. 244-251.

Steinwandt, et al., "Performance Analysis of ESPRIT-Type Algorithms for Co-Array Structures", Dec. 10, 2017, 5 pages.

Sun, et al., "MIMO Radar for Advanced Driver-Assistance Systems and Autonomous Driving: Advantages and challenges", Jul. 2020, pp. 98-117.

Visentin, et al., "Analysis of Multipath and DOA Detection Using a Fully Polarimetric Automotive Radar", Apr. 2018, 8 pages.

Zhou, et al., "A Robust and Efficient Algorithm for Coprime Array Adaptive Beamforming", IEEE Transactions on Vehicular Technology, vol. 67, No. 2, Feb. 2018, pp. 1099-1112.

Zoltowski, et al., "ESPRIT-Based 2-D Direction Finding with a Sparse Uniform Array of Electromagnetic Vector Sensors", Aug. 1, 2000, pp. 2195-2204.

"Extended European Search Report", EP Application No. 23158330.3, Aug. 25, 2023, 17 pages.

"Extended European Search Report", EP Application No. 23165460.9, Sep. 15, 2023, 16 pages.

"Extended European Search Report", EP Application No. 22200994.6, Aug. 11, 2023, 15 pages.

Wu, et al., "A Low Complexity Adaptive Algorithm for Eigenspace-Based Two-Dimensional Direction of Arrival Tracking", IEICE Transactions on Fundamentals of Electronics, Communications and Computer Sciences, vol. E92-A, No. 8, Aug. 1, 2019, pp. 2097-2106.

"Extended European Search Report", EP Application No. 20155495.3, Aug. 7, 2020, 11 pages.

"Extended European Search Report", EP Application No. 20155499.5, Aug. 7, 2020, 11 pages.

"Extended European Search Report", EP Application No. 20155503.4, Jul. 24, 2020, 9 pages.

"Extended European Search Report", EP Application No. 20213050.6, May 25, 2021, 11 pages.

"Extended European Search Report", EP Application No. 22197753.1, Mar. 7, 2023, 17 pages.

"FR5CPEC Radar sensor for vehicular use Teardown Internal Photos Robert Bosch GmbH", Retrieved at: https://fccid.io/NF3FR5CPEC/Internal-Photos/internal-Photos-4041421, Oct. 10, 2018, 6 pages.

Trummer, "A Polarimetric 76-79 GHz Radar-Frontend for Target Classification in Automotive Use", Oct. 2016, 4 pages.

Zhang, et al., "Flexible Array Response Control via Oblique Projection", IEEE Transactions on Signal Processing, vol. 67, No. 12, Jun. 15, 2019, pp. 3126-3139.

* cited by examiner

RADAR SYSTEM WITH PAIRED ONE-DIMENSIONAL AND TWO-DIMENSIONAL ANTENNA ARRAYS

CROSS-REFERENCE TO RELATED APPLICATION

This application claims the benefit under 35 U.S.C. 119(e) of U.S. Provisional Application No. 63/142,434, filed Jan. 27, 2021, the disclosure of which is incorporated in its entirety by reference herein.

BACKGROUND

Radar systems use antennas to transmit and receive electromagnetic (EM) signals for detecting and tracking objects. In automotive applications, radar antennas can include a two-dimensional (2D) array of elements to measure an azimuth angle and elevation angle associated with the objects. The resolution of the azimuth and elevation angles is generally proportional to the aperture size of the array. Realizing a large aperture with a 2D array may require many antenna elements, which increases cost. It is desirable to maintain the angular resolution of radar systems for both azimuth and elevation angle estimates with minimal antenna elements and cost.

SUMMARY

This document describes techniques and systems of a radar system with paired one-dimensional (1D) and 2D antenna arrays. Even with far fewer antenna elements than a traditional radar system, the paired arrays enable an example radar system to have a comparable angular resolution at a lower cost and lower complexity level. For example, a radar system includes a processor and an antenna that can receive electromagnetic energy reflected by one or more objects. The antenna includes a 1D (e.g., linear) array and a 2D array. The 1D array includes antenna elements positioned in a first direction (e.g., azimuth direction) and spaced apart by a first distance and a second distance in the first direction. The 2D array includes at least four other antenna elements positioned in the first direction and a second direction (e.g., elevation direction) that is orthogonal to the first direction. The other antenna elements are spaced apart by a third distance in the second direction and by the sum of the first direction and the second direction in the first direction. The processor can determine, using electromagnetic energy received by the 1D array, first and second angles in the first direction associated with the one or more objects. The processor can also determine, using EM energy received by the 2D array, third angles and fourth angles associated with the one or more objects. The third angles are in the first direction, and the fourth angles are in the second direction. The processor can then associate, using the second angles and the third angles, the first angles and the fourth angles with respective objects of the one or more objects.

This document also describes methods performed by the above-summarized system and other configurations of the radar system set forth herein and means for performing these methods.

This Summary introduces simplified concepts related to a radar system with paired 1D and 2D antenna arrays, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a radar system with paired 1D and 2D antenna arrays are described in this document with reference to the following figures. The same numbers are often used throughout the drawings to reference like features and components.

DETAILED DESCRIPTION

Overview

Figure 1:
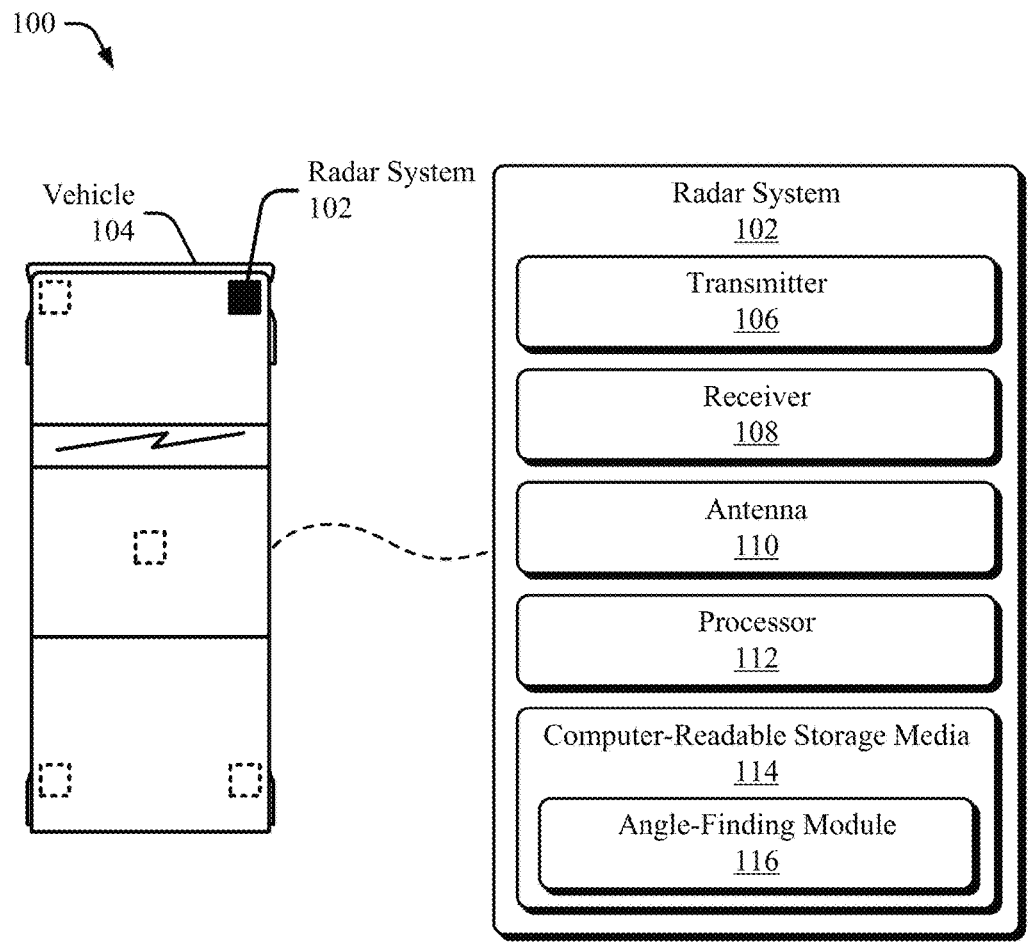
FIG. 1 illustrates an example environment in which a radar system with paired 1D and 2D antenna arrays can be implemented.
Figure 1:
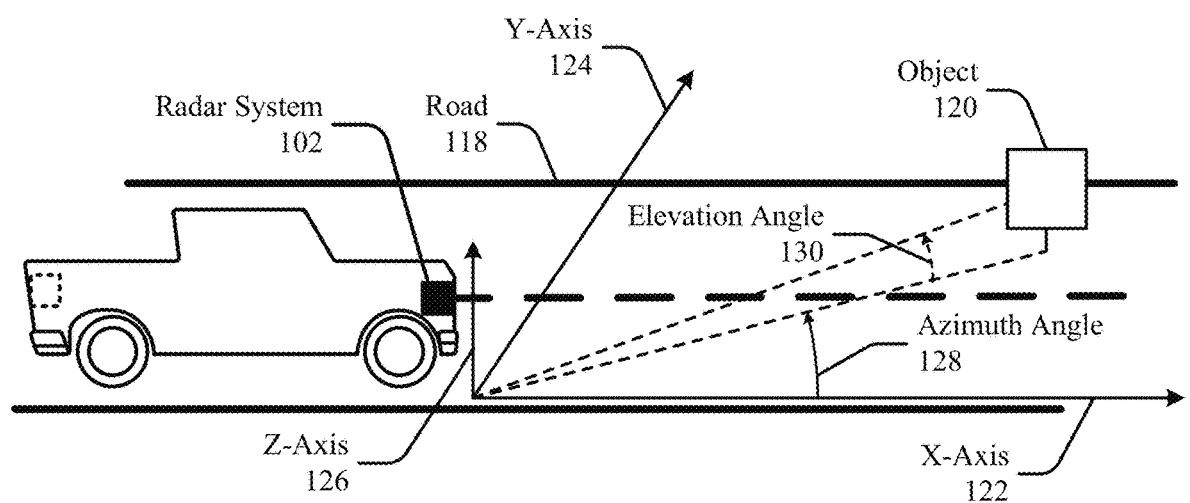

Radar systems can be configured as an important sensing technology that vehicle-based systems use to acquire information about the surrounding environment. For example, vehicle-based systems can use radar systems to detect objects in or near a roadway and, if necessary, take necessary actions (e.g., reduce speed, change lanes) to avoid a collision. Radar systems generally include at least two antennas to transmit and receive EM radiation. Some radar systems include a receive antenna with a one-dimensional (1D) linear array of antenna elements to measure the azimuth angle or the elevation angle associated with objects. Such radar systems can estimate a single angle (e.g., elevation angle or azimuth angle) associated with objects. A large aperture in the azimuth direction or the elevation direction can also increase the number of antenna elements and the cost to provide sufficient angular resolution.

Some other radar systems include a receive antenna with a two-dimensional (2D) planar array of antenna elements to estimate both the azimuth angle and the elevation angle of objects. In such a radar system, the angular position of objects can be estimated using digital beamforming. In digital beamforming, the radar system characterizes the angular information for objects by analyzing the relative phase across the antenna elements using a 2D fast Fourier transform (FFT). The angular resolution of such radar systems generally depends on the aperture size of the 2D planar array. A larger aperture size can improve the angular resolution but requires additional antenna elements and increased costs.

Yet other radar systems include a receive antenna with a sparse 2D array of antenna elements. Such radar systems can use the azimuth linear array and the elevation linear array to estimate the azimuth and elevation angles of objects, respectively. These radar systems use matching algorithms to associate the azimuth angle and elevation angle for each object. Although such systems generally include fewer antenna elements than planar 2D arrays, the increased aperture size tends to introduce grating lobes in the radiation pattern, especially if the array spacing is larger than one-half a wavelength of the EM signals. The angle finding for these systems can also be too complicated for many applications, including automotive applications.

In contrast, this document describes techniques and systems to provide a receive antenna with paired 1D and 2D arrays to support angle-finding features. For example, a radar system can include an antenna array with a first sparse 1D array and a sparse 2D array. The 1D array is positioned in a first direction (e.g., elevation direction or azimuth direction) and includes multiple antenna elements spaced apart by a first distance and a second distance. The 2D array includes multiple antenna elements spaced apart by the sum of the first distance and the second distance in the first direction and by a third distance and/or a fourth distance in a second direction (e.g., azimuth direction or elevation direction). The second direction is orthogonal to the first direction. In this way, the described systems and techniques can reduce the number of antenna elements while preserving the angular resolution that can otherwise be achieved using a rectangular 2D array with similar aperture sizing.

The radar system estimates, using EM energy received by the paired 1D and 2D arrays, elevation and azimuth angles associated with one or more nearby objects. The radar system can then associate the elevation and azimuth angles with respective objects of the one or more objects. In this way, the computational complexity for the described radar system to associate the azimuth angles and elevation angles to respective objects is similar to the computational complexity for a conventional radar system with conventional 2D planar arrays. The described angle-finding technique can be applied to various configurations of the described paired 1D and 2D arrays.

This example is just one example of the described techniques and systems of a radar system with paired 1D and 2D antenna arrays. This document describes other examples and implementations.

Operating Environment

FIG. 1 illustrates an example environment 100 in which a radar system 102 with paired 1D and 2D antenna arrays can be implemented. In the depicted environment 100, the radar system 102 is mounted to, or integrated within, a vehicle 104. The radar system 102 can detect one or more objects 120 in the vicinity of the vehicle 104. Although illustrated as a car, the vehicle 104 can represent other types of motorized vehicles (e.g., an automobile, a motorcycle, a bus, a tractor, a semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount the radar system 102 to any moving platform, including moving machinery or robotic equipment.

In the depicted implementation, the radar system 102 is mounted on the front of the vehicle 104 and illuminates the object 120. The radar system 102 can detect the object 120 from any exterior surface of the vehicle 104. For example, the radar system 102 can be integrated into a bumper, side mirror, headlights, rear lights, or any other interior or exterior location where the object 120 requires detection. In some cases, the vehicle 104 includes multiple radar systems 102, such as a first radar system 102 and a second radar system 102, that provide a larger instrument field-of-view. In general, the radar system 102 can be designed to have parts of the radar system 102 distributed at different locations of the vehicle 104 to provide a particular field-of-view that encompasses a region of interest. Example fields-of-view include a 360-degree field-of-view, one or more 180-degree fields-of-view, one or more 90-degree fields-of-view, and so forth, which can overlap or be combined into a field-of-view of a particular size.

The object 120 is composed of one or more materials that reflect radar signals. Depending on the application, the object 120 can represent a target of interest. In some cases, the object 120 can be a moving object (e.g., another vehicle) or a stationary object (e.g., a roadside sign).

The radar system 102 emits EM radiation by transmitting EM signals or waveforms via antenna elements. In the environment 100, the radar system 102 can detect and track the object 120 by transmitting and receiving one or more radar signals. For example, the radar system 102 can transmit EM signals between 100 and 400 gigahertz (GHz), between 4 and 100 GHz, or between approximately 70 and 80 GHz.

The radar system 102 can include a transmitter 106 and at least one antenna 110 to transmit EM signals. The radar system 102 can also include a receiver 108 and the at least one antenna 110 to receive reflected versions of the EM signals. The transmitter 106 includes one or more components for emitting the EM signals. The receiver 108 includes one or more components for detecting the reflected EM signals. The transmitter 106 and the receiver 108 can be incorporated together on the same integrated circuit (e.g., a transceiver integrated circuit) or separately on different integrated circuits. In other implementations, the radar system 102 does not include a separate antenna 110, but the transmitter 106 and the receiver 108 each include an antenna or antenna elements.

The radar system 102 also includes one or more processors 112 (e.g., an energy processing unit) and computer-readable storage media (CRM) 114. The processor 112 can be a microprocessor or a system-on-chip. The processor 112 can execute instructions stored in the CRM 114. For example, the processor 112 can process EM energy received by the antenna 110 and determine, using an angle-finding module 116, a location of the object 120 relative to the radar system 102. The processor 112 can also generate radar data for at least one automotive system. For example, the processor 112 can control, based on processed EM energy from the antenna 110, an autonomous or semi-autonomous driving system of the vehicle 104.

The angle-finding module 116 obtains EM energy received by the antenna 110 or the receiver 108 and determines azimuth angles and elevation angles associated with the object 120. The angle-finding module 116 can be implemented as instructions in the CRM 114, hardware, software, or a combination thereof that is executed by the processor 112.

The radar system 102 can determine a distance to the object 120 based on the time it takes for the EM signals to travel from the radar system 102 to the object 120, and from the object 120 back to the radar system 102. The radar system 102 can also determine, using the angle-finding module 116, a location of the object 120 in terms of an azimuth angle 128 and an elevation angle 130 based on the direction of a maximum-amplitude echo signal received by the radar system 102.

As an example, FIG. 1 illustrates the vehicle 104 traveling on a road 118. The radar system 102 detects the object 120 in front of the vehicle 104. The radar system 102 can define a coordinate system with an x-axis 122 (e.g., in a forward direction along the road 118), a y-axis 124 (e.g., perpendicular to the x-axis 122 and along a surface of the road 118), and a z-axis 126 (e.g., perpendicular to the surface of the road 118). The radar system 102 can locate the object 120 in terms of the azimuth angle 128 and the elevation angle 130. The azimuth angle 128 can represent a horizontal angle from the x-axis 122 to the object 120. The elevation angle 130 can represent a vertical angle from the surface of the road 118 (e.g., a plane defined by the x-axis 122 and the y-axis 124) to the object 120.

The vehicle 104 can also include at least one automotive system that relies on data from the radar system 102, such as a driver-assistance system, an autonomous-driving system, or a semi-autonomous-driving system. The radar system 102 can include an interface to an automotive system that relies on the data. For example, the processor 112 outputs, via the interface, a signal based on EM energy received by the receiver 108 or the antenna 110.

Generally, the automotive systems use radar data provided by the radar system 102 to perform a function. For example, the driver-assistance system can provide blind-spot monitoring and generate an alert that indicates a potential collision with the object 120 that is detected by the radar system 102. The radar data from the radar system 102 indicates when it is safe or unsafe to change lanes in such an implementation. The autonomous-driving system may move the vehicle 104 to a particular location on the road 118 while avoiding collisions with the object 120 detected by the radar system 102. The radar data provided by the radar system 102 can provide information about a distance to and the location of the object 120 to enable the autonomous-driving system to perform emergency braking, perform a lane change, or adjust the speed of the vehicle 104.

Figure 2A:
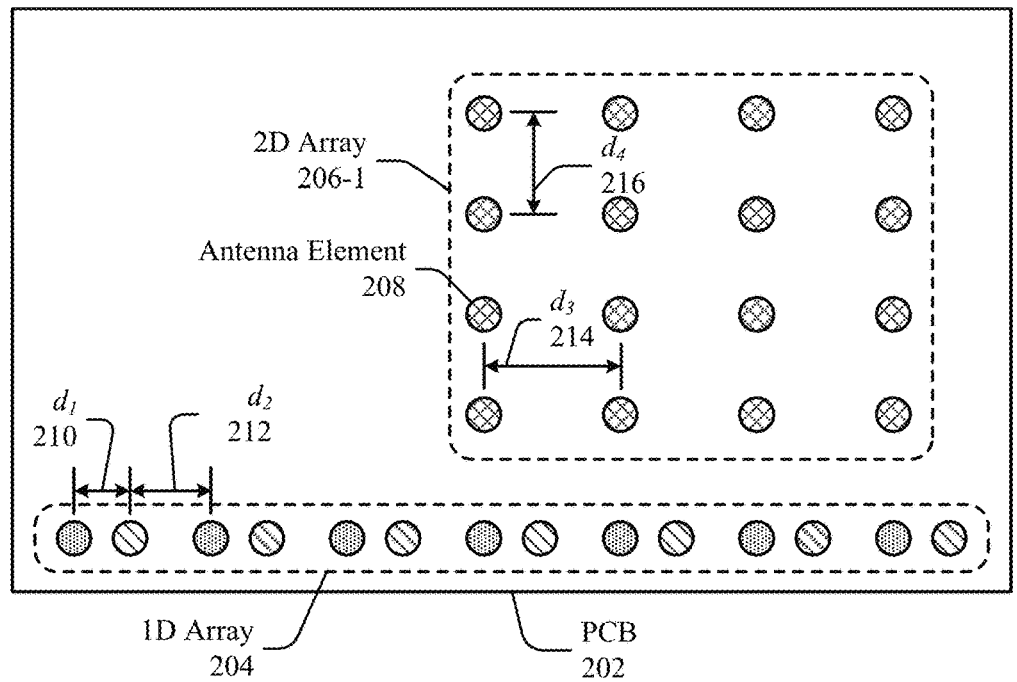
FIGS. 2A and 2B illustrate example antennas with paired 1D and 2D antenna arrays.
Figure 2B:
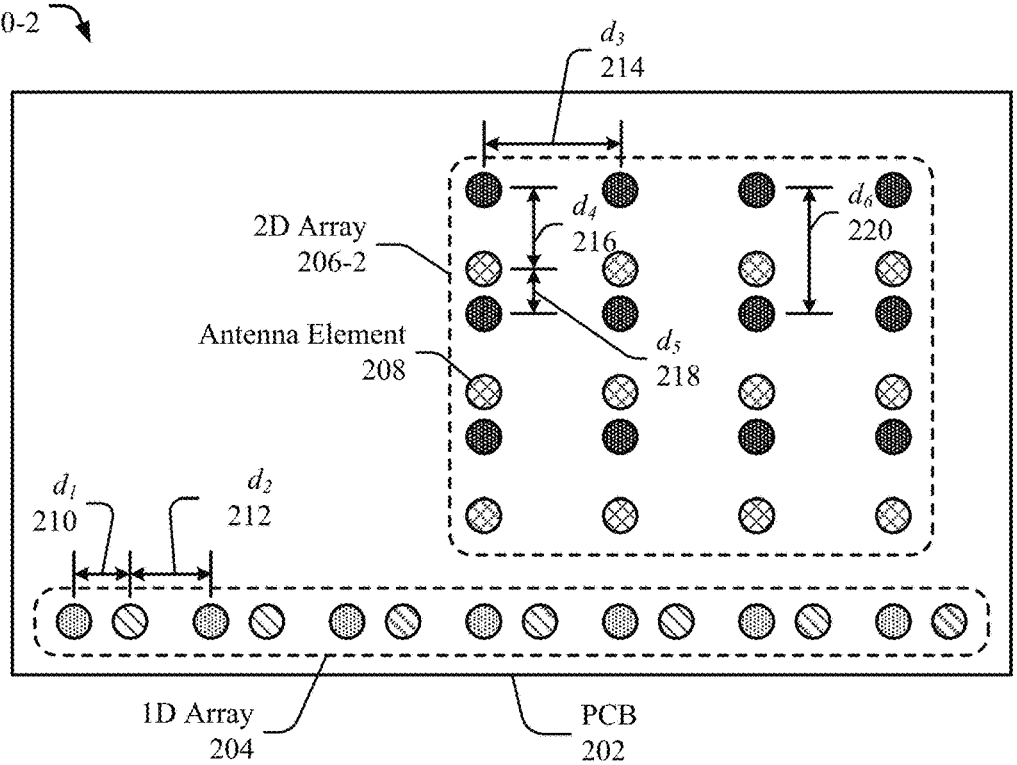

FIGS. 2A and 2B illustrate example antennas 200 with paired 1D and 2D arrays. The antennas 200 (e.g., antenna 200-1 and antenna 200-2) are examples of the antenna 110 of the radar system 102 in FIG. 1, with similar components. The antennas 200 include multiple antenna elements 208. The antenna elements 208 represent physical locations or phase-center locations of elements of a 1D array 204 and 2D array 206. The antenna elements 208 can also represent synthetic locations or phase-center locations of elements of the antennas 200 formed by multiple-input and multiple-output (MIMO) techniques.

Fixed to a printed circuit board (PCB) 202, the antennas 200 include the 1D array 204 in a first direction (e.g., an azimuth array) and the 2D array 206 (e.g., 2D array 206-1 and 2D array 206-2) in the first direction (e.g., the azimuth direction) and a second direction orthogonal to the first direction (e.g., the elevation direction). The antennas 200 can be fabricated with different materials, components, and techniques in other implementations. For example, the antennas 200 can include a lens antenna, a metalized plastic antenna, a dish antenna, a horn antenna, or a combination thereof.

In operation, the antennas 200 can receive EM energy reflected by one or more objects 120. In the depicted implementations, the 1D array 204 is positioned in an azimuth direction. In other implementations, the 1D array 204 can be positioned in an elevation direction or another direction. In the depicted implementations, the 1D array 204 is positioned below the 2D array 206-1 and 206-2. The 1D array 204 can be positioned above or to the side of the 2D array 206-1 or 206-2 in other implementations. For example, the 1D array 204 and the 2D array 206-1 or the 2D array 206-2 can be configured or arranged in an approximately T-shape (e.g., the 1D array 204 positioned above the 2D array 206-1), an approximately upside-down T-shape (e.g., the 1D array 204 positioned below the 2D array 206-1), or an approximately cross shape (e.g., the 1D array 204 positioned through the approximate center of the 2D array 206-1).

The 1D array 204 is a sparse linear array that includes multiple antenna elements 208. The antenna elements 208 are alternatingly spaced apart by a first distance, $d_1$, 210 and a second distance, $d_2$, 212. For the illustrated implementation of the antenna 200-1 in FIG. 2A and moving left-to-right, the antenna elements 208 of the 1D array 204 are separated by the first distance 210, the second distance 212, the first distance 210, the second distance 212, and so forth. Every other antenna element 208 of the 1D array 204 is separated by a third distance, $d_3$, 214, which represents the sum of the first distance 210 and the second distance 212. In other words, the 1D array 204 can be formed by two uniform linear arrays, which both include antenna elements 208 spaced apart by the third distance 214 and that are offset by the first distance 210.

The antenna elements 208 of the 2D arrays 206 can be arranged in an approximately rectangular shape, as illustrated in FIGS. 2A and 2B. These antenna elements 208 can be positioned close to the antenna elements 208 of the 1D array (e.g., as illustrated in FIGS. 2A and 2B). In other implementations, the antenna elements 208 of the 2D arrays 206 can overlap with (e.g., the 1D array can be positioned at a lateral end of the 2D arrays 206 or in between the lateral ends of the 2D arrays 206) or be separated from the antenna elements 208 of the 1D array 204. The antenna elements 208 of the 2D arrays 206 can be arranged in a two-dimensional sparse array, as illustrated in FIGS. 2A and 2B. The specific arrangement of the 1D array 204 and the 2D arrays 206 can be chosen based on the position and arrangement of other components in the radar system 102.

The 2D array 206 is a sparse 2D array that includes at least four antenna elements 208. The antenna elements 208 are spaced apart by the third distance 214 in the azimuth direction (or the same direction as the 1D array 204). The antenna elements 208 of the 2D array 206-1 in the antenna 200-1 of FIG. 2A are spaced apart by a fourth distance, $d_4$, 214 in the elevation direction (or the direction orthogonal to the direction of the 1D array 204). The antenna elements 208 of the 2D array 206-2 in the antenna 200-2 of FIG. 2B are alternatingly spaced apart by the fourth distance 216 and a fifth distance, $d_5$, 218 in the elevation direction (or the direction orthogonal to the direction of the 1D array 204). For the illustrated implementation of the antenna 200-2 in FIG. 2B and moving top-to-bottom, the antenna elements 208 of the 2D array 206-2 are separated in the elevation direction by the fourth distance 216, the fifth distance 218, the fourth distance 216, the fifth distance 218, and so forth. Every other antenna element 208 of the 2D array 204 is separated by a sixth distance, d6, 220 in the elevation direction, representing the sum of the fourth distance 216 and the fifth distance 218. In other words, the 2D array 206-2 can be formed by two uniform 2D arrays, which both include antenna elements 208 spaced apart by the sixth distance 220 in the elevation direction and that are offset by the fourth distance 216. As described with respect to FIGS. 3 through 6, the angle-finding module 116 uses the first distance 210, the second distance 212, the third distance 214, the fourth distance 216, the fifth distance 218, and/or the sixth distance 220 to associate an elevation angle to an azimuth angle for a respective object 120.

The 1D array 204 and the 2D array 206 include multiple antenna elements 208. The 1D array 204 can include M antenna elements 208. The 2D array 206 can include N antenna elements 208 (e.g., at least four) not encompassed by the 1D array 204. In automotive applications, the number of antenna elements 208 in the 2D array 206 can be greater than an anticipated maximum number of objects 120 to be detected by the radar system 102. The number, N, of antenna elements 208 in the 2D array 206 is generally less than the product of M and P, where P represents the number of antenna elements 208 in the elevation direction of the 2D array 206. In some implementations, N is less than half of the product of M and P (e.g., $$N < \frac{M \times P}{2}).$$

The total number of antenna elements 208 in the antenna 200 generally equals M+N. The number of antenna elements 208 in the antenna 200 (e.g., M+N) is generally much less than the number of antenna elements 208 in a rectangular array (e.g., M×P) with the same aperture sizing.

In the depicted implementation of FIG. 2A, the 1D array 204 includes 14 antenna elements 208 and the 2D array 206 includes 16 antenna elements 208 not encompassed by the 1D array 204. The antenna 200-1 includes 30 antenna elements 208, much less than 80 antenna elements included in a rectangular array with the same aperture sizing. In other implementations, the 1D array 204 and the 2D array 206 can include fewer or additional antenna elements 208. The 2D array 206 generally includes at least four antenna elements 208 not encompassed by the 1D array 204.

The 1D array 204 and 2D array 206 can be planar arrays that provide high gain and low loss. Planar arrays are well-suited for vehicle integration due to their small size. For example, the antenna elements 208 can be slots etched or otherwise formed in a plating material of one surface of the PCB 202 for a substrate-integrated waveguide (SIW) antenna. As another example, the antenna elements 208 can be radiation slots of a waveguide antenna built with metalized plastic and/or metal. The antenna elements 208 can also be part of an aperture antenna, a microstrip antenna, or a dipole antenna. For example, the 1D array 204 and the 2D array 206 can include subarrays of patch elements (e.g., microstrip patch antenna subarrays) or dipole elements.

Figure 3:
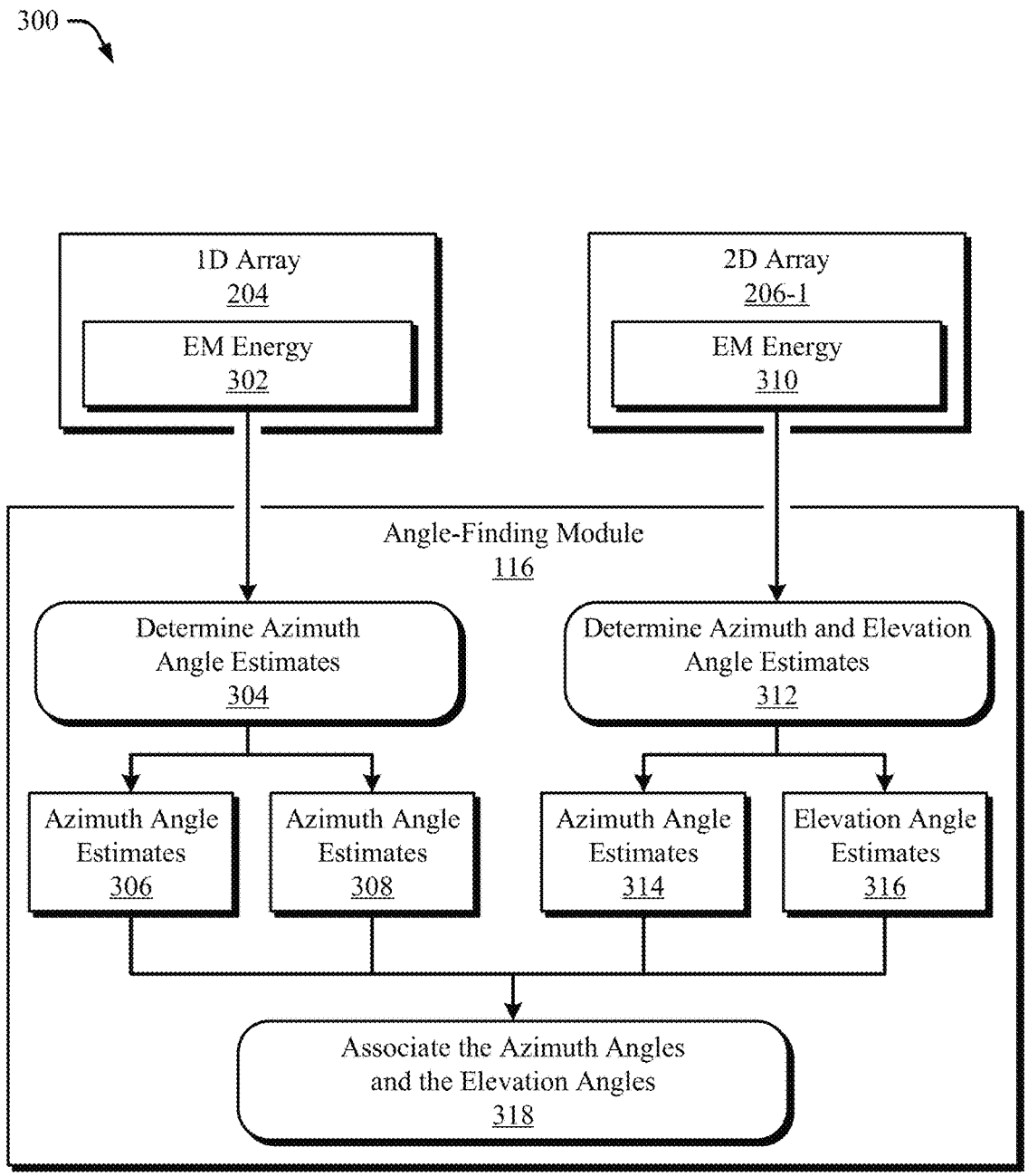
FIG. 3 illustrates an example conceptual diagram of a radar system with paired 1D and 2D antenna arrays.

FIG. 3 illustrates an example conceptual diagram 300 of a radar system with a paired 1D array and 2D array and the angle-finding module 116. The radar system of FIG. 3 can, for example, be the radar system 102 of FIG. 1. The radar system 102 includes a paired 1D array and 2D array. In the depicted implementation, the radar system 102 includes the 1D array 204 and the 2D array 206-1 of the antenna 200-1, which can be arranged in a variety of positions, including the arrangement illustrated in FIG. 2A.

At 304, the angle-finding module 116 obtains EM energy 302 received by the 1D array 204 and determines azimuth angle estimates 306 and 308 associated with one or more objects 120. For example, the angle-finding module 116 can determine the azimuth angle estimates 306, $\theta_1, \theta_2, \ldots, \theta_N$, based on the first distance, $d_1$, 210, where N represents the estimated number of targets. The angle-finding module 116 can also determine the azimuth angle estimates 308, $\varphi_1, \varphi_2, \ldots, \varphi_N$, based on the third distance, $d_3$, 214, which represents the sum of the first distance 210 and the second distance 212.

At 312, the angle-finding module 116 obtains EM energy 310 received by the 2D array 206-1 and determines azimuth angle estimates 314 and elevation angle estimates 316 associated with the one or more objects 120. For example, the angle-finding module 116 can determine the azimuth angle estimates 314, $\varphi_1, \varphi_2, \ldots, \varphi_N$, based on the third distance, $d_1$, 210. The angle-finding module 116 can also determine the elevation angle estimates 316, $\phi_1, \phi_2, \ldots, \phi_N$, based on the fourth distance 216, $d_4$.

The angle-finding module 116 can use various angle-finding functions to determine the azimuth angle estimates 306, the azimuth angle estimates 308, the azimuth angle estimates 314, and the elevation angle estimates 316 from the EM energy 302 and the EM energy 310. As non-limiting examples, the angle-finding module 116 can use a pseudo-spectrum function, including a Space-Alternating Generalized Expectation-maximization (SAGE), Delay-and-Sum (DS), Minimum Variance Distortionless Response (MVDR), and/or a Multiple Signal Classification (MUSIC) based-function, to calculate the direction of arrival of the EM signals received by the 1D array 204 and the 2D array 206-1. As another example, the angle-finding module 116 can use an Estimation of Signal Parameters via Rotational Invariance Technique (ESPRIT) technique or FFT beamforming to calculate the azimuth angle estimates 306, the azimuth angle estimates 308, the azimuth angle estimates 314, and the elevation angle estimates 316. The angle-finding module 116 can determine the azimuth angle estimates and the elevation angle estimates with relatively low processing complexity and cost.

At 318, the angle-finding module 116 associates, based on common (e.g., shared) azimuth angle estimates 308 and 314, the azimuth angle estimates 306 and the elevation angle estimates 316 for the objects 120. In particular, the angle-finding module 116 determines the azimuth angle estimate 306 and the elevation angle estimate 316 associated with each of the one or more objects 120. An example of the conceptual diagram 300 is described in greater detail with respect to FIG. 4.

Figure 4:
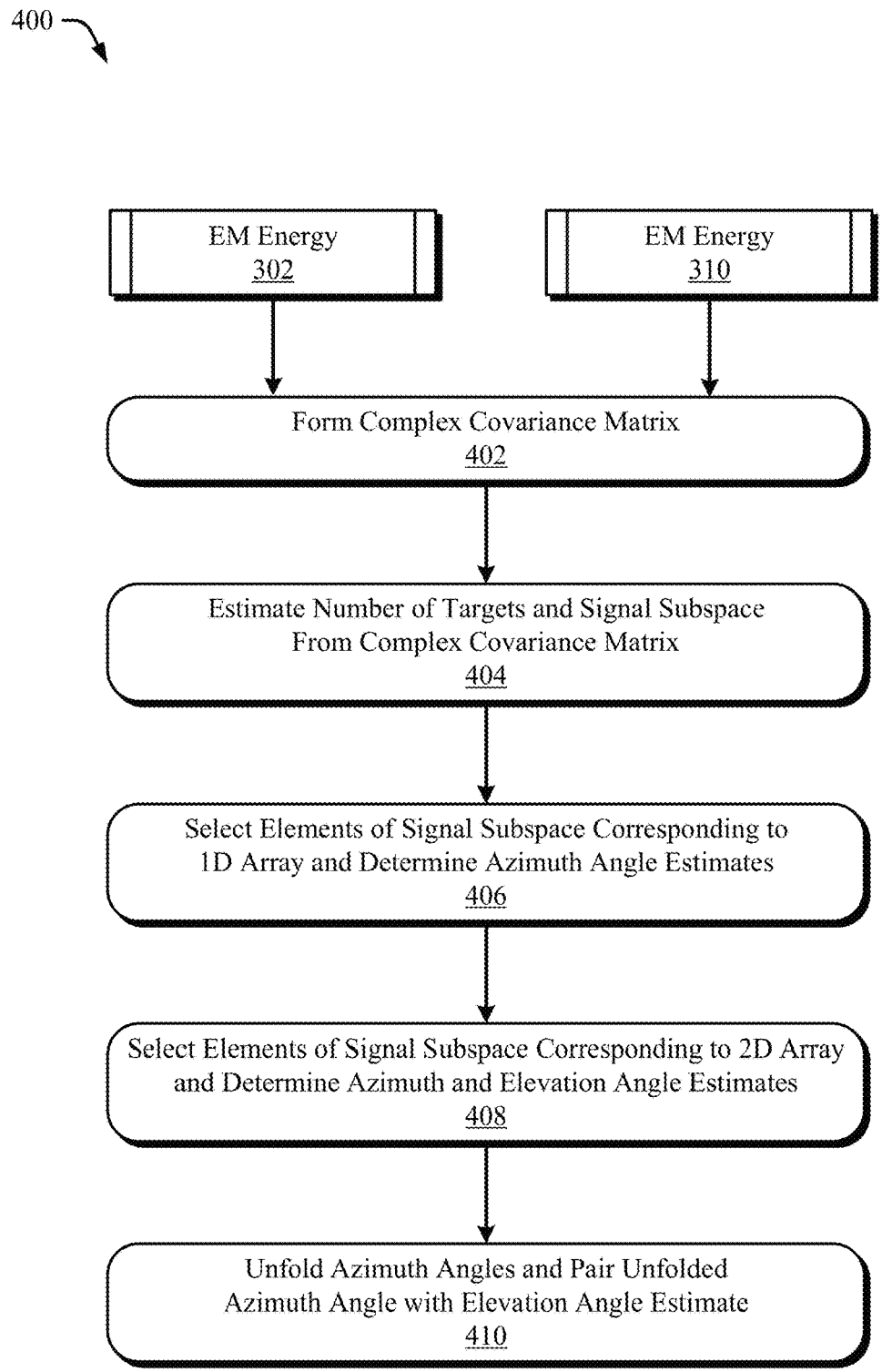
FIG. 4 illustrates an example conceptual diagram of an angle-finding module to associate, using paired 1D and 2D antenna arrays, azimuth angles and elevation angles to respective objects.

FIG. 4 illustrates an example conceptual diagram 400 of an angle-finding module to associate azimuth angle estimates 306 and elevation angle estimates 316 to respective objects 120. The angle-finding module of FIG. 4 can, for example, be the angle-finding module 116 of FIGS. 1 through 3. As described with respect to FIG. 3, the angle-finding module 116 determines the azimuth angle estimates 306 and the elevation angle estimates 316 associated with the objects 120.

At 402, the angle-finding module 116 can form or generate a complex covariance matrix based on the EM energy 302 and the EM energy 310 received by the 1D array 204 and the 2D array 206-1, respectively. For example, the angle-finding module 116 can form the complex covariance matrix, R, using Equation (1):

$$R = xx^H \tag{1}$$

where x represents the measurements from the EM energy 302 and the EM energy 310, and H represents a Hermitian matrix (e.g., a self-adjoint matrix) of x. The Hermitian matrix is a complex square matrix that is equal to its own conjugate transpose (e.g., an element in the i-th row and the j-th column is equal to the complex conjugate of the element in the j-th row and the i-th column).

At 404, the angle-finding module 116 can estimate the number of targets, N, (e.g., detected objects 120) and the signal subspace, $E_s$, from the complex covariance matrix, R, using eigenvalue decomposition.

At 406, the angle-finding module 116 can select elements of the signal subspace, $E_s$, corresponding to the 1D array 204 and determine the azimuth angle estimates 306, $\theta_1$, $\theta_2$, . . . , $\theta_N$, and the azimuth angle estimates 308, $\varphi_1$, $\varphi_2$, . . . , $\varphi_N$, where N represents the estimated number of objects 120. The angle-finding module 116 can, for example, apply two-dimensional unitary Estimation of Signal Parameters via Rotational Invariance Technique (ESPRIT) to estimate the azimuth angles. The azimuth angle estimates 306 are based on the first distance 210, and the azimuth angle estimates 308 are based on the third distance 214. In other implementations, the angle-finding module 116 can use other pseudo-spectrum functions, including Space-Alternating Generalized Expectation-maximization (SAGE), Delay-and-Sum (DS), Minimum Variance Distortionless Response (MVDR), and/or a Multiple Signal Classification (MUSIC) based-function, to calculate the direction of arrival of the EM signals received by the 1D array 204. The angle-finding module 116 can determine the azimuth angle estimates 306 and 308 with relatively low processing complexity and cost.

At 408, the angle-finding module 116 can select elements of the signal subspace corresponding to the 2D array 206-1 and determine the azimuth angle estimates 314, $\varphi_1$, $\varphi_2$, . . . , $\varphi_N$, and the elevation angle estimates 316, $\phi_1$, $\phi_2$, . . . , $\phi_N$, where N represents the estimated number of objects 120. The angle-finding module 116 can, for example, apply two-dimensional unitary ESPRIT to estimate the azimuth angles and elevation angles. The azimuth angle estimates 314 are based on the third distance 214 in the 2D array 206-1, and the elevation angle estimates 316 are based on the fourth distance 216 in the 2D array 206-1. The angle-finding module 116 can use other pseudo-spectrum functions in other implementations, including SAGE, Delay-and-Sum, MVDR, and/or MUSIC based-function to calculate the direction of arrival of the EM signals received by the 2D array 206-1. The angle-finding module 116 can determine the azimuth angle estimates 314 and the elevation angle estimates 316 with relatively low processing complexity and cost.

At 410, the angle-finding module 116 can unfold azimuth angles from the azimuth angle estimates 306, 308, and 314 and pair unfolded azimuth angle estimates 306 with the elevation angle estimates 316. The elevation angle estimates 316 can be paired with the azimuth angle estimates 306 using common or shared angles in the azimuth angle estimates 308 and 314. For example, the angle-finding module 116 can automatically pair multiple angle pairs from among the elevation angle estimates 316 and the azimuth angle estimates 306 estimated using 2D ESPRIT. As described above, the azimuth angle estimates 308 and 314 are both based on the third distance 214 in the azimuth direction.

Figure 5:
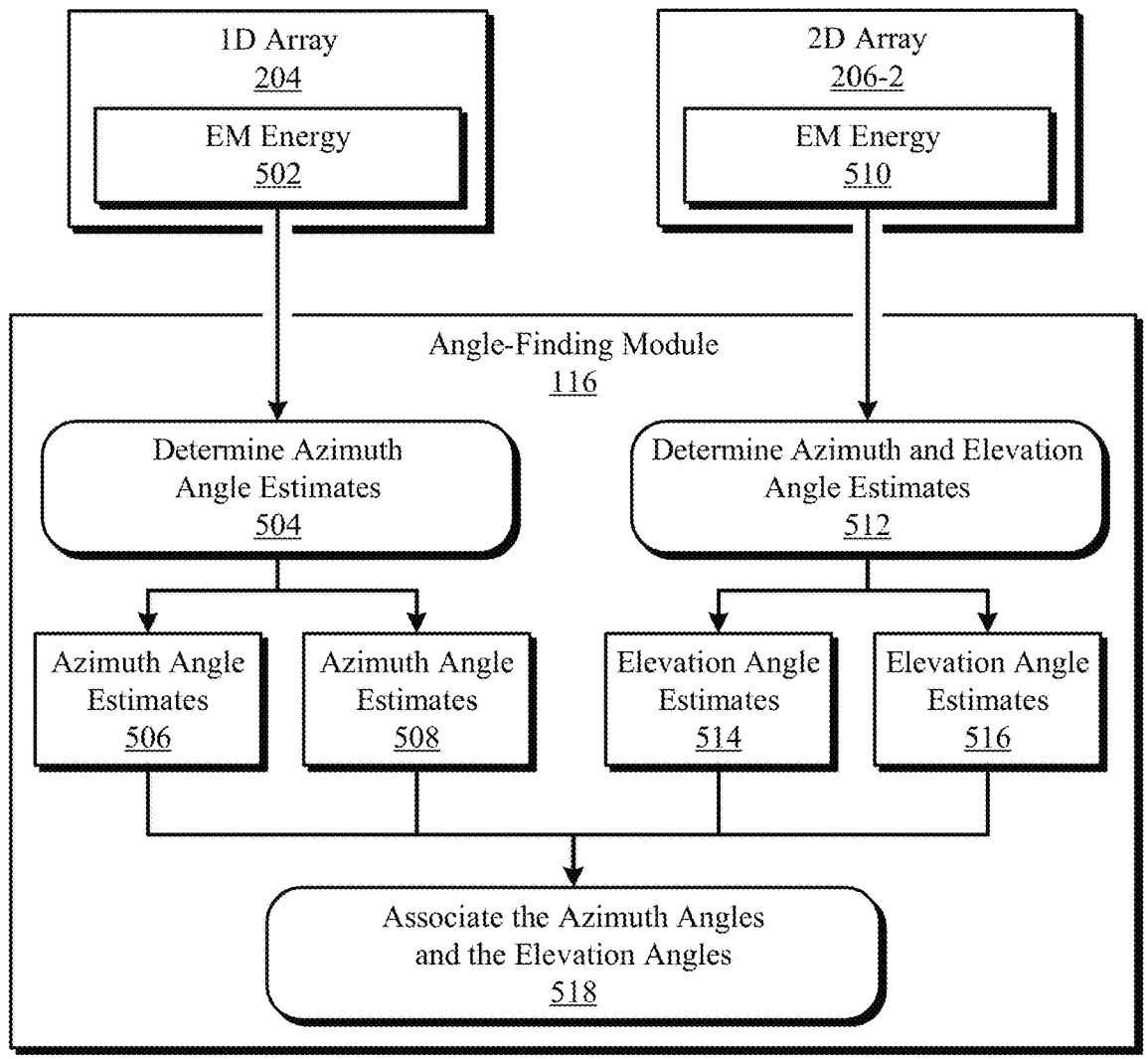
FIG. 5 illustrates another example conceptual diagram of a radar system with paired 1D and 2D antenna arrays.

FIG. 5 illustrates another example conceptual diagram 500 of a radar system with a paired 1D array and 2D array and the angle-finding module 116. The radar system of FIG. 5 can, for example, be the radar system 102 of FIG. 1. The radar system 102 includes a paired 1D array and 2D array. In the depicted implementation, the radar system 102 includes the 1D array 204 and the 2D array 206-2 of the antenna 200-2, which can be arranged in a variety of positions, including the arrangement illustrated in FIG. 2B.

At 504, the angle-finding module 116 obtains EM energy 502 received by the 1D array 204 and determines azimuth angle estimates 506 and 508 associated with one or more objects 120. For example, the angle-finding module 116 can determine the azimuth angle estimates 506, $\theta_1$, $\theta_2$, . . . , $\theta_N$, based on the first distance, $d_1$, 210, where N represents the estimated number of targets. The angle-finding module 116 can also determine the azimuth angle estimates 508, $\varphi_1$, $\varphi_2$, . . . , $\varphi_N$, based on the third distance, $d_3$, 214, which represents the sum of the first distance 210 and the second distance 212.

At 512, the angle-finding module 116 obtains EM energy 510 received by the 2D array 206-2 and determines elevation angle estimates 514 and elevation angle estimates 516 associated with the one or more objects 120. For example, the angle-finding module 116 can determine the elevation angle estimates 514, $\phi_1$, $\phi_2$, . . . , $\phi_N$, based on the sixth distance, $d_6$, 220. The angle-finding module 116 can also determine the elevation angle estimates 516, $\beta_1$, $\beta_2$, . . . , $\beta_N$, based on the fourth distance 216, $d_4$.

The angle-finding module 116 can use various angle-finding functions to determine the azimuth angle estimates 506, the azimuth angle estimates 508, the elevation angle estimates 514, and the elevation angle estimates 516 from the EM energy 502 and the EM energy 510. As described above, the angle-finding module 116 can use a pseudo-spectrum function, including a SAGE, DS, MVDR, and/or a MUSIC based-function, to calculate the direction of arrival of the EM signals received by the 1D array 204 and the 2D array 206-2. As another example, the angle-finding module 116 can use an ESPRIT technique or FFT beamforming to calculate the azimuth angle estimates 506, the azimuth angle estimates 508, the elevation angle estimates 514, and the elevation angle estimates 516. The angle-finding module 116 can determine the azimuth angle estimates and the elevation angle estimates with relatively low processing complexity and cost.

At 518, the angle-finding module 116 associates, based on the common azimuth angle estimates 508 and the elevation angle estimate 514, the azimuth angle estimates 506 and the elevation angle estimates 516 to the objects 120. In particular, the angle-finding module 116 determines the azimuth angle estimate 506 and the elevation angle estimate 516 associated with each of the one or more objects 120. An example of the conceptual diagram 500 is described in greater detail with respect to FIG. 6.

Figure 6:
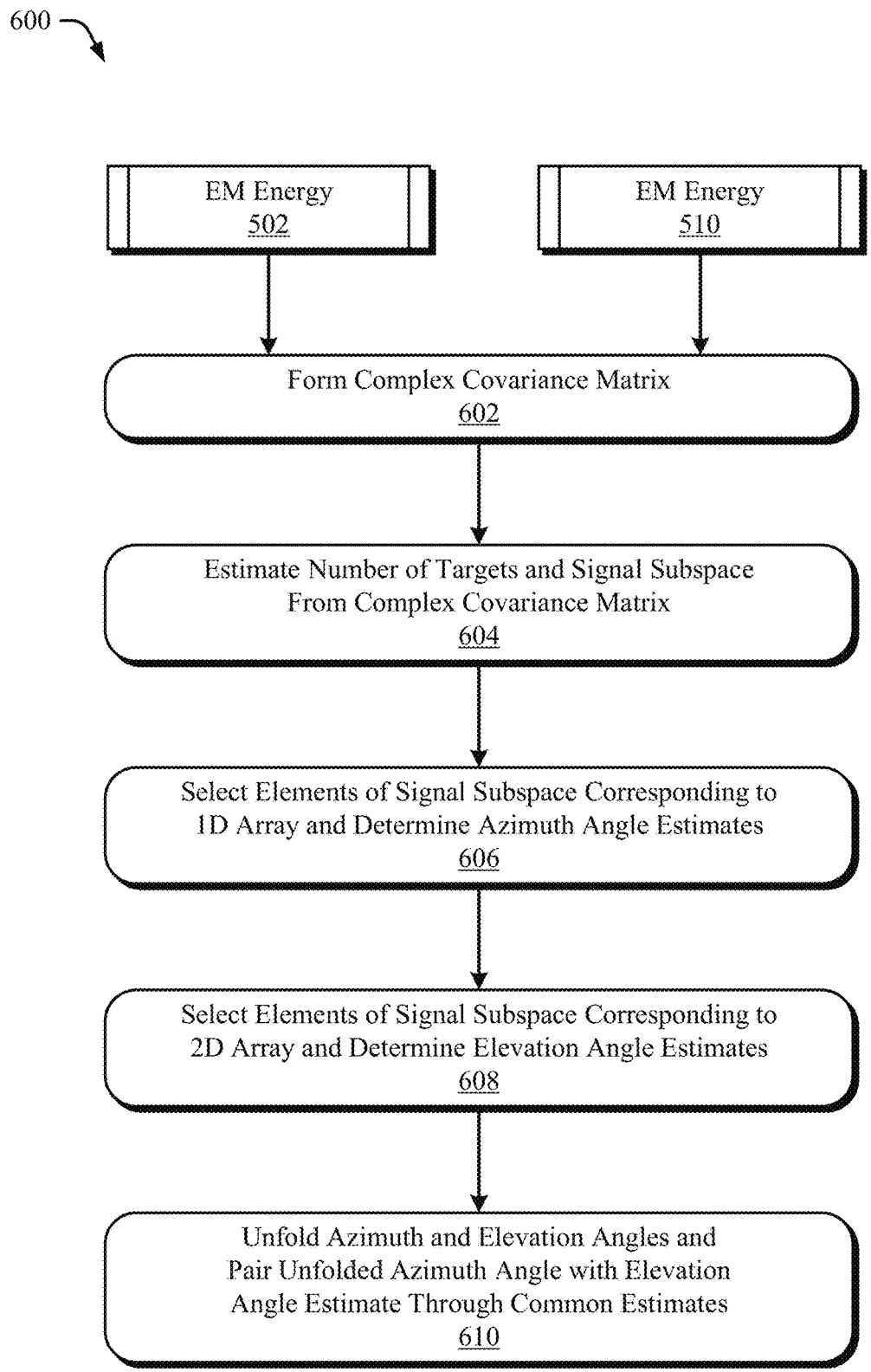
FIG. 6 illustrates another example conceptual diagram of an angle-finding module to associate, using paired 1D and 2D antenna arrays, azimuth angles and elevation angles to respective objects.

FIG. 6 illustrates another example conceptual diagram 600 of an angle-finding module to associate azimuth angle estimates 506 and elevation angle estimates 516 to respective objects 120. The angle-finding module of FIG. 6 can, for example, be the angle-finding module 116 of FIGS. 1 through 3. As described with respect to FIG. 5, the angle-finding module 116 determines the azimuth angle estimates 506 and the elevation angle estimates 516 associated with the objects 120.

At 602, the angle-finding module 116 can form or generate a complex covariance matrix based on the EM energy 502 and the EM energy 510 received by the 1D array 204 and the 2D array 206-2, respectively. For example, the angle-finding module 116 can form the complex covariance matrix, R, using Equation (2):

$$R = xx^H \tag{2}$$

where x represents the measurements from the EM energy 502 and the EM energy 510 and H represents a Hermitian matrix (e.g., a self-adjoint matrix) of x. The Hermitian matrix is a complex square matrix that is equal to its own conjugate transpose (e.g., an element in the i-th row and the j-th column is equal to the complex conjugate of the element in the j-th row and the i-th column).

At 604, the angle-finding module 116 can estimate the number of targets, N, (e.g., detected objects 120) and the signal subspace, $E_s$, from the complex covariance matrix, R, using eigenvalue decomposition.

At 606, the angle-finding module 116 can select elements of the signal subspace corresponding to the 1D array 204 and determine the azimuth angle estimates 506, $\theta_1, \theta_2, \ldots, \theta_N$, and the azimuth angle estimates 508, $\varphi_1, \varphi_2, \ldots, \varphi_N$, where N represents the estimated number of objects 120. The angle-finding module 116 can, for example, apply two-dimensional unitary ESPRIT to estimate the azimuth angles. The azimuth angle estimates 506 are based on the first distance 210, and the azimuth angle estimates 508 are based on the third distance 214. In other implementations, the angle-finding module 116 can use other pseudo-spectrum functions, including SAGE, DS, MVDR, and/or a MUSIC based-function, to calculate the direction of arrival of the EM signals received by the 1D array 204. The angle-finding module 116 can determine the azimuth angle estimates 506 and 508 with relatively low processing complexity and cost.

At 608, the angle-finding module 116 can select elements of the signal subspace corresponding to the 2D array 206-2 and determine the elevation angle estimates 514, $\phi_1, \phi_2, \ldots, \phi_N$, and the elevation angle estimates 516, $\beta_1, \beta_2, \ldots, \beta_N$, where N represents the estimated number of objects 120. The angle-finding module 116 can, for example, apply two-dimensional unitary ESPRIT to estimate the elevation angles. The elevation angle estimates 514 are based on the sixth distance 220 in the 2D array 206-2, and the elevation angle estimates 516 are based on the fourth distance 216 in the 2D array 206-2. In other implementations, the angle-finding module 116 can use other pseudo-spectrum functions, including SAGE, DS, MVDR, and/or MUSIC based-functions, to calculate the direction of arrival of the EM signals received by the 2D array 206-2. The angle-finding module 116 can determine the potential elevation angle estimates 514 and the elevation angle estimates 516 with relatively low processing complexity and cost.

At 610, the angle-finding module 116 can unfold azimuth angles from the azimuth angle estimates 506 and 508. The angle-finding module 116 can also unfold elevation angles from the elevation angle estimates 514 and 516. The angle-finding module 116 can then pair unfolded azimuth angle estimates 506 with elevation angle estimates 516. The elevation angle estimates 516 can be paired with the azimuth angle estimates 506 using common or shared angle pairs in the azimuth angle estimates 508 and the elevation angle estimates 514.

Example Method

Figure 7:
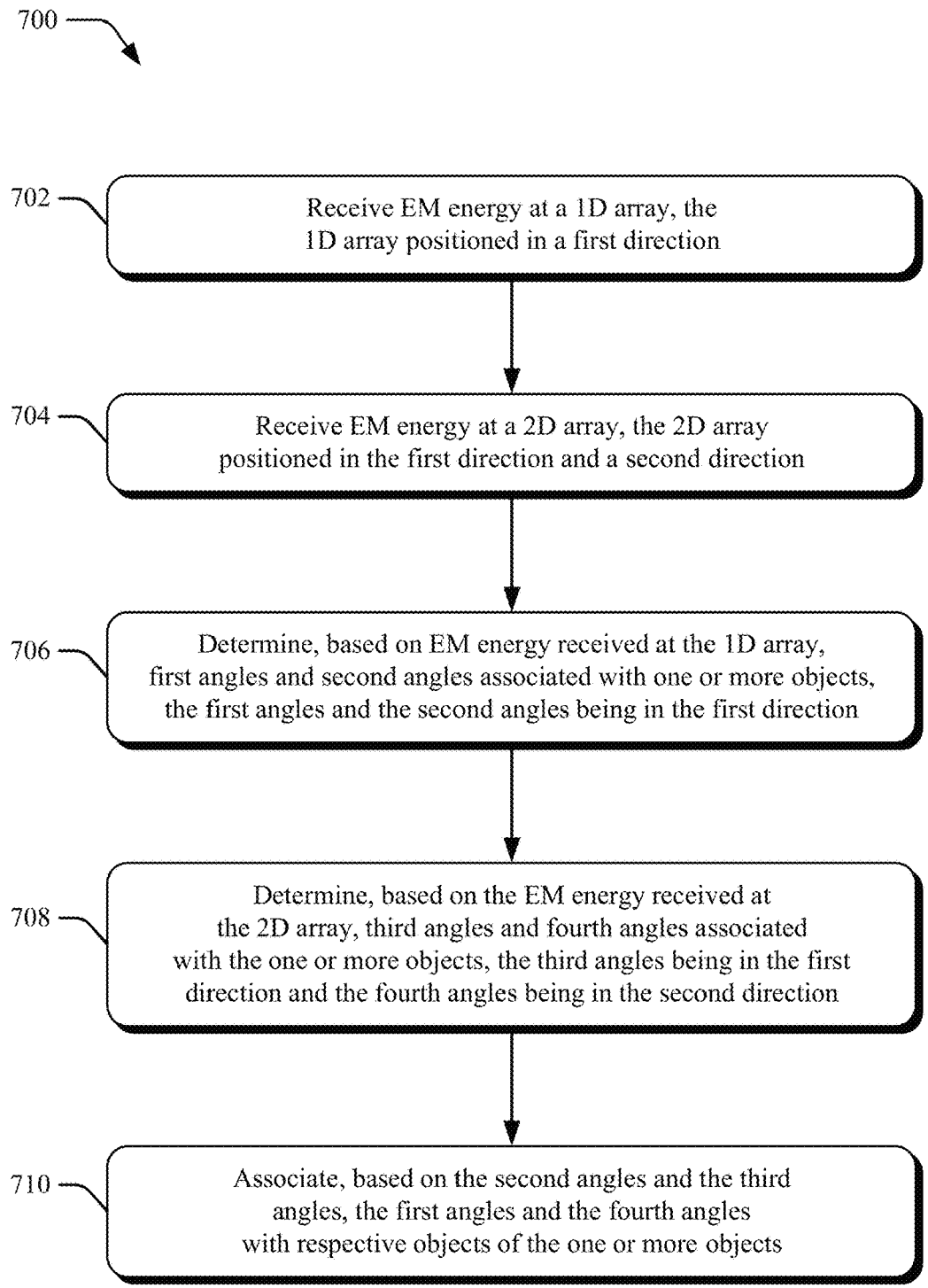
FIG. 7 illustrates an example method of a radar system with paired 1D and 2D antenna arrays and an angle-finding module.

FIG. 7 illustrates an example method 700 of the radar system 102 with paired 1D and 2D antenna arrays and the angle-finding module 116. Method 700 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 6, reference to which is made for example only. The techniques are not limited to performance by one entity or multiple entities.

At 702, an antenna of a radar system receives EM energy at a 1D array reflected by one or more objects. The 1D array includes first antenna elements positioned in a first direction and spaced apart by a first distance and a second distance in the first direction. For example, the antenna 200-1 or the antenna 200-2 of the radar system 102 can receive the EM energy 302 or 502 at the 1D array 204 reflected by the one or more objects 120. The 1D array 204 can include multiple antenna elements 208 positioned in the azimuth direction. In other implementations, the antenna elements 208 of the 1D array 204 can be positioned in the elevation direction or another direction. The antenna elements 208 of the 1D array 204 are alternatingly spaced apart by the first distance, $d_1$, 210 and the second distance, $d_2$, 212.

At 704, an antenna of the radar system receives EM energy at a 2D array reflected by the one or more objects. The 2D array includes at least four second antenna elements not encompassed by the 1D array. The second antenna elements are positioned in the first direction and a second direction, which is orthogonal to the first direction. The second antenna elements are spaced apart in the first direction by a sum of the first distance and a second distance. At least some of the second antenna elements are spaced apart by a third distance in the second direction. For example, the antenna 200-1 or the antenna 200-2 of the radar system 102 can receive EM energy 310 or 510 at the 2D array 206-1 or the 2D array 206-2, respectively, reflected by the one or more objects 120. The 2D arrays 206 can include multiple antenna elements 208 positioned in the azimuth direction and the elevation direction. In particular, the 2D arrays 206 include at least four antenna elements 208 not encompassed by the 1D array 204. In other implementations, the antenna elements 208 of the 2D arrays 206 can be positioned in other directions that are orthogonal to one another. The antenna elements 208 of the 2D arrays 206 are spaced apart by the third distance, $d_3$, 214, in the azimuth direction. The third distance 214 represents the sum of the first distance 210 and the second distance 212. The antenna elements 208 of the 2D array 206-1 are spaced apart by the fourth distance, $d_4$, 216 in the elevation direction. The antenna elements 208 of the 2D array 206-2 are alternatingly spaced apart by the fourth distance, $d_4$, 216 and the fifth distance, $d_5$, 218 in the elevation direction.

At 706, first angles and second angles associated with the one or more objects are determined based on EM energy received at the 1D array. The first angles and the second angles are in the first direction. For example, the processor 112 of the radar system 102 can determine, using the angle-finding module 116 and the EM energy 302 received by the 1D array 204, the azimuth angle estimates 306 and 308 associated with the one or more objects 120.

At 708, third angles and fourth angles associated with the one or more objects are determined using EM energy received by the 2D array. The third angles are in the first direction, and the fourth angles are in the second direction. For example, the processor 112 can determine, using the angle-finding module 116 and the EM energy 310 received by the 2D array 206-1, the azimuth angle estimates 314 and the elevation angle estimates 316 associated with the one or more objects 120.

At 710, the first angles and the fourth angles are associated with respective objects of the one or more objects using the second angles and the third angles. For example, the processor 112 can associate, using the angle-finding module 116 and the azimuth angle estimates 308 and the azimuth angle estimates 314, the azimuth angle estimates 306 and the elevation angle estimates 316 with respective objects of the one or more objects 120.

EXAMPLES

In the following section, examples are provided.

Example 1: A radar system comprising: an antenna configured to receive electromagnetic (EM) energy reflected by one or more objects, the antenna comprising: a one-dimensional (1D) array comprising first antenna elements positioned in a first direction, the first antenna elements spaced apart by a first distance and a second distance in the first direction; and a two-dimensional (2D) array comprising at least four second antenna elements not encompassed by the 1D array and positioned in the first direction and a second direction, the second direction being orthogonal to the first direction, at least some of the second antenna elements spaced apart by a third distance in the second direction and by a sum of the first distance and the second distance in the first direction; and one or more processors configured to: determine, using the EM energy received at the 1D array, first angles and second angles associated with one or more objects, the first angles and the second angles being in the first direction; determine, using the EM energy received at the 2D array, third angles and fourth angles associated with the one or more objects, the third angles being in the first direction and the fourth angles being in the second direction; and associate, using the second angles and the third angles, the first angles and the fourth angles with respective objects of the one or more objects.

Example 2: The radar system of example 1, wherein: the first angles are determined based on the first distance; the second angles are determined based on the sum of the first distance and the second distance; and the third angles are determined based on the third distance.

Example 3: The radar system of example 1, wherein the second antenna elements are spaced apart by the third distance and a fourth distance in the second direction.

Example 4: The radar system of example 3, wherein the one or more processors are further configured to: determine, using the EM energy received by the 2D array, fifth angles associated with the one or more objects, the fifth angles in the second direction, wherein the one or more processors are configured to associate the first angles and the third angles with the respective objects of the one or more objects by at least associating, using the second angles, the fourth angles, and the fifth angles, the first angles and the third angles with respective objects of the one or more objects.

Example 5: The radar system of example 4, wherein: the first angles are determined based on the first distance; the second angles and the fourth angles are determined based on the sum of the first distance and the second distance; the third angles are determined based on the third distance; and the fifth angles are determined based on the sum of the third distance and the fourth distance.

Example 6: The radar system of example 1, wherein the one or more processors are configured to associate the first angles and the fourth angles with the respective objects of the one or more objects in the following manner: generate, using the EM energy received at the 1D array and the 2D array, a complex covariance matrix; determine, using eigenvalue decomposition of the complex covariance matrix, an estimate of a number of the one or more objects; unfold the first angles and the fourth angles; and pair the unfolded fourth angles with the unfolded first angles using common values of the second angles and the third angles.

Example 7: The radar system of example 4, wherein the one or more processors are configured to associate the first angles and the fourth angles with the respective objects of the one or more objects in the following manner: generate, using the EM energy received at the 1D array and the 2D array, a complex covariance matrix; determine, using eigenvalue decomposition of the complex covariance matrix, an estimate of a number of the one or more objects; unfold the first angles, the second angles, the third angles, the fourth angles, and the fifth angles; and pair the unfolded fourth angles with the unfolded first angles using common values of the second angles and the fifth angles.

Example 8: The radar system of example 1, wherein the 1D array is positioned in an azimuth direction and the 2D array is positioned in the azimuth direction and an elevation direction.

Example 9: The radar system of example 1, wherein the 1D array is a linear array.

Example 10: The radar system of example 9, wherein the 1D array and the 2D array are configured in an approximately T-shape, an approximately upside-down T-shape, or an approximately cross shape.

Example 11: The radar system of example 1, wherein the 1D array comprises a first number of antenna elements and the 2D array comprises a second number of antenna elements in the first direction, the first number of antenna elements greater than the second number of antenna elements.

Example 12: The radar system of example 1, wherein the second antenna elements of the 2D array are configured in an approximately rectangular shape.

Example 13: The radar system of example 1, wherein the second antenna elements of the 2D array are positioned in a sparse array.

Example 14: The radar system of example 1, wherein the first angles, the second angles, the third angles, and the fourth angles are determined using at least one of an Estimation of Signal Parameters via Rotational Invariance Technique (ESPRIT), Space-Alternating Generalized Expectation-maximization (SAGE), Delay-and-Sum (DS), Minimum Variance Distortionless Response (MVDR), a Multiple Signal Classification (MUSIC), or a fast Fourier transform (FFT) beamforming based-function.

Example 15: The radar system of example 1, wherein the radar system is configured to be installed on an automobile.

Example 16: A computer-readable storage media comprising computer-executable instructions that, when executed, cause a processor of a radar system to: receive, by an antenna of the radar system, electromagnetic (EM) energy reflected by one or more objects; determine, using the EM energy received by a one-dimensional (1D) array of the antenna, first angles and second associated with one or more objects, the 1D array comprising first antenna elements positioned in a first direction that are spaced apart by a first distance and a second distance in the first direction, the first angles and the second angles being in the first direction; determine, using the EM energy received by a two-dimensional (2D) array of the antenna, third angles and fourth associated with the one or more objects, the 2D array comprising at least four second antenna elements not encompassed by the 1D array and positioned in the first direction and a second direction, the second direction being orthogonal to the first direction, at least some of the second antenna elements spaced apart by a third distance in the second direction and by a sum of the first distance and the second distance in the first direction, the third angles being in the first direction and the fourth angles being in the second direction; and associate, using the second angles and the third angles, the first angles and the fourth angles with respective objects of the one or more objects.

Example 17: The computer-readable storage media of example 16, wherein: the first angles are determined based on the first distance; the second angles are determined based on the sum of the first distance and the second distance; and the third angles are determined based on the third distance.

Example 18: The computer-readable storage media of example 16, wherein the second antenna elements are spaced apart by the third distance and a fourth distance in the second direction.

Example 19: The computer-readable storage media of example 18, the computer-readable storage media comprising further computer-executable instructions that, when executed, cause a processor of a radar system to: determine, using the EM energy received by the 2D array, fifth angles associated with the one or more objects, the fifth angles in the second direction, wherein association of the first angles and the third angles with the respective objects of the one or more objects comprises associate, using the second angles, the fourth angles, and the fifth angles, the first angles and the third angles with respective objects of the one or more objects.

Example 20: A method comprising: receiving, by an antenna of a radar system, electromagnetic (EM) energy reflected by one or more objects; determining, using the EM energy received by a one-dimensional (1D) array of the antenna, first angles and second associated with one or more objects, the 1D array comprising first antenna elements positioned in a first direction that are spaced apart by a first distance and a second distance in the first direction, the first angles and the second angles being in the first direction; determining, using the EM energy received by a two-dimensional (2D) array of the antenna, third angles and fourth associated with the one or more objects, the 2D array comprising at least four second antenna elements not encompassed by the 1D array and positioned in the first direction and a second direction, the second direction being orthogonal to the first direction, at least some of the second antenna elements spaced apart by a third distance in the second direction and by a sum of the first distance and the second distance in the first direction, the third angles being in the first direction and the fourth angles being in the second direction; and associating, using the second angles and the third angles, the first angles and the fourth angles with respective objects of the one or more objects.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A radar system comprising:
an antenna configured to receive electromagnetic (EM) energy reflected by one or more objects, the antenna comprising:
a one-dimensional (1D) array comprising first antenna elements positioned in a first direction, the first antenna elements spaced apart by a first distance and a second distance in the first direction; and
a two-dimensional (2D) array comprising at least four second antenna elements not encompassed by the 1D array and positioned in the first direction and a second direction, the second direction being orthogonal to the first direction, at least some of the second antenna elements spaced apart by a third distance in the second direction and by a sum of the first distance and the second distance in the first direction; and
one or more processors configured to:
determine, using the EM energy received at the 1D array, first angles and second angles associated with one or more objects, the first angles and the second angles being in the first direction;
determine, using the EM energy received at the 2D array, third angles and fourth angles associated with the one or more objects, the third angles being in the first direction and the fourth angles being in the second direction; and
associate, using the second angles and the third angles, the first angles and the fourth angles with respective objects of the one or more objects.

2. The radar system of claim 1, wherein:
the first angles are determined based on the first distance;
the second angles are determined based on the sum of the first distance and the second distance; and
the third angles are determined based on the third distance.

3. The radar system of claim 1, wherein the second antenna elements are spaced apart by the third distance and a fourth distance in the second direction.

4. The radar system of claim 3, wherein the one or more processors are further configured to:
determine, using the EM energy received by the 2D array, fifth angles associated with the one or more objects, the fifth angles in the second direction,
wherein association of the first angles and the third angles with the respective objects of the one or more objects comprises associate, using the second angles, the fourth angles, and the fifth angles, the first angles and the third angles with respective objects of the one or more objects.

5. The radar system of claim 4, wherein:
the first angles are determined based on the first distance;
the second angles and the fourth angles are determined based on the sum of the first distance and the second distance;
the third angles are determined based on the third distance; and
the fifth angles are determined based on the sum of the third distance and the fourth distance.

6. The radar system of claim 1, wherein the one or more processors are configured to associate the first angles and the fourth angles with the respective objects of the one or more objects in the following manner:
generate, using the EM energy received at the 1D array and the 2D array, a complex covariance matrix;
determine, using eigenvalue decomposition of the complex covariance matrix, an estimate of a number of the one or more objects;
unfold the first angles and the fourth angles; and
pair the unfolded fourth angles with the unfolded first angles using common values of the second angles and the third angles.

7. The radar system of claim 4, wherein the one or more processors are configured to associate the first angles and the fourth angles with the respective objects of the one or more objects in the following manner:
generate, using the EM energy received at the 1D array and the 2D array, a complex covariance matrix;
determine, using eigenvalue decomposition of the complex covariance matrix, an estimate of a number of the one or more objects;
unfold the first angles, the second angles, the third angles, the fourth angles, and the fifth angles; and
pair the unfolded fourth angles with the unfolded first angles using common values of the second angles and the fifth angles.

8. The radar system of claim 1, wherein the 1D array is positioned in an azimuth direction and the 2D array is positioned in the azimuth direction and an elevation direction.

9. The radar system of claim 1, wherein the 1D array is a linear array.

10. The radar system of claim 9, wherein the 1D array and the 2D array are configured in an approximately T-shape, an approximately upside-down T-shape, or an approximately cross shape.

11. The radar system of claim 1, wherein the 1D array comprises a first number of antenna elements and the 2D array comprises a second number of antenna elements in the first direction, the first number of antenna elements greater than the second number of antenna elements.

12. The radar system of claim 1, wherein the second antenna elements of the 2D array are configured in an approximately rectangular shape.

13. The radar system of claim 1, wherein the second antenna elements of the 2D array are positioned in a sparse array.

14. The radar system of claim 1, wherein the first angles, the second angles, the third angles, and the fourth angles are determined using at least one of an Estimation of Signal Parameters via Rotational Invariance Technique (ESPRIT), Space-Alternating Generalized Expectation-maximization (SAGE), Delay-and-Sum (DS), Minimum Variance Distortionless Response (MVDR), a Multiple Signal Classification (MUSIC), or a fast Fourier transform (FFT) beamforming based-function.

15. The radar system of claim 1, wherein the radar system is configured to be installed on an automobile.

16. A non-transitory computer-readable storage media comprising computer-executable instructions that, when executed, cause a processor of a radar system to:
receive, by an antenna of the radar system, electromagnetic (EM) energy reflected by one or more objects;
determine, using the EM energy received by a one-dimensional (1D) array of the antenna, first angles and second associated with one or more objects, the 1D array comprising first antenna elements positioned in a first direction that are spaced apart by a first distance and a second distance in the first direction, the first angles and the second angles being in the first direction;
determine, using the EM energy received by a two-dimensional (2D) array of the antenna, third angles and fourth associated with the one or more objects, the 2D array comprising at least four second antenna elements not encompassed by the 1D array and positioned in the first direction and a second direction, the second direction being orthogonal to the first direction, at least some of the second antenna elements spaced apart by a third distance in the second direction and by a sum of the first distance and the second distance in the first direction, the third angles being in the first direction and the fourth angles being in the second direction; and
associate, using the second angles and the third angles, the first angles and the fourth angles with respective objects of the one or more objects.

17. The non-transitory computer-readable storage media of claim 16, wherein:
the first angles are determined based on the first distance;
the second angles are determined based on the sum of the first distance and the second distance; and
the third angles are determined based on the third distance.

18. The non-transitory computer-readable storage media of claim 16, wherein the second antenna elements are spaced apart by the third distance and a fourth distance in the second direction.

19. The non-transitory computer-readable storage media of claim 18, the non-transitory computer-readable storage media comprising further computer-executable instructions that, when executed, cause a processor of a radar system to:
determine, using the EM energy received by the 2D array, fifth angles associated with the one or more objects, the fifth angles in the second direction,
wherein association of the first angles and the third angles with the respective objects of the one or more objects comprises associate, using the second angles, the fourth angles, and the fifth angles, the first angles and the third angles with respective objects of the one or more objects.

20. A method comprising:
receiving, by an antenna of a radar system, electromagnetic (EM) energy reflected by one or more objects;
determining, using the EM energy received by a one-dimensional (1D) array of the antenna, first angles and second associated with one or more objects, the 1D array comprising first antenna elements positioned in a first direction that are spaced apart by a first distance and a second distance in the first direction, the first angles and the second angles being in the first direction;
determining, using the EM energy received by a two-dimensional (2D) array of the antenna, third angles and fourth associated with the one or more objects, the 2D array comprising at least four second antenna elements not encompassed by the 1D array and positioned in the first direction and a second direction, the second direction being orthogonal to the first direction, at least some of the second antenna elements spaced apart by a third distance in the second direction and by a sum of the first distance and the second distance in the first direction, the third angles being in the first direction and the fourth angles being in the second direction; and
associating, using the second angles and the third angles, the first angles and the fourth angles with respective objects of the one or more objects.

* * * * *